United States Patent [19]

Nissen et al.

[11] Patent Number: 5,301,556
[45] Date of Patent: Apr. 12, 1994

[54] FLOW MEASURING APPARATUS

[75] Inventors: Peter Nissen, Rosdorf; Hans W. Schwiderski, Norten-Hardenberg, both of Fed. Rep. of Germany

[73] Assignee: Fischer & Porter Company, Warminster, Pa.

[21] Appl. No.: 993,909

[22] Filed: Dec. 18, 1992

Related U.S. Application Data

[63] Continuation of Ser. No. 681,997, Apr. 8, 1991, abandoned.

[30] Foreign Application Priority Data

Apr. 9, 1990 [EP] European Pat. Off. ........... 90106783

[51] Int. Cl.⁵ ............................................. G01F 1/58
[52] U.S. Cl. ................. 73/861.15; 73/861.16
[58] Field of Search ........... 73/861.11, 861.15, 861.17, 73/861.16, 861.12

[56] References Cited

U.S. PATENT DOCUMENTS

| 3,991,612 | 11/1978 | Mannherz et al. | 73/194 |
| 4,008,609 | 2/1977 | Lambrecht et al. | 73/861.13 |
| 4,408,497 | 10/1983 | Suzuki | 73/861.16 |

FOREIGN PATENT DOCUMENTS

| 0451308 | 4/1990 | European Pat. Off. | |
| 2743954 | 4/1979 | Fed. Rep. of Germany | |
| 0050613 | 3/1982 | Japan | 73/861.15 |
| 0087418 | 5/1983 | Japan | 73/861.15 |
| 58-87418 | 8/1983 | Japan | |

Primary Examiner—Richard E. Chilcot, Jr.
Assistant Examiner—R. Biegel
Attorney, Agent, or Firm—Ratner & Prestia

[57] ABSTRACT

A liquid flow measuring system which, by means of a suitable timing sequence, is able to detect unbalanced voltage generation which occurs when the tube element through which the liquid is flowing is not completely full and, by means of a correction process, supplies an output signal which is proportional to the rate of flow. When the tube element is full, the system operates in the same way as a normal magnetically inductive flowmeter. If the level in the tube element falls, electrodes which are installed in the lower half of the tube element and other electrodes, if necessary, can be used exclusively or additionally to record the measured values. Moreover, with a view to improving the recording of measured values when the level falls below a specific limit, an arrangement of electromagnets, specially optimized for partially filled tube elements, can be activated instead of the normal arrangement of electromagnets.

5 Claims, 2 Drawing Sheets

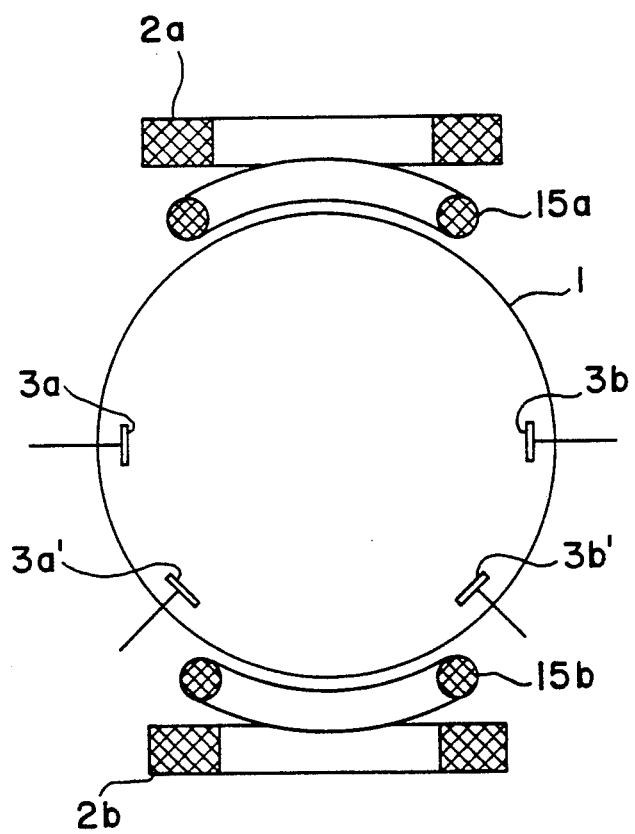

FLOW MEASURING APPARATUS

This application is a continuation of application Ser. No. 07/681,997 filed Apr. 8, 1991 now abandoned.

TECHNICAL FIELD

The present invention relates to a circuit arrangement for measuring the flow of a liquid containing electric charges.

BACKGROUND TO THE INVENTION

A circuit arrangement of this type is known from DE-OS 27 43 954.

It often happens, particularly when a circuit arrangement of this type is used for measuring waste water which flows through a tube element, that the tube element is not completely filled. A siphon is required in order to ensure that the tube element becomes and always remains completely full. However, the disadvantage of a siphon of this type is that additional flow resistance is created for the liquid and that, furthermore, substantial construction costs are involved in producing the siphon, particularly in the case of very wide tube elements.

It is known to provide several electrode pairs, by means of which a separate additional measurement of the level of liquid in the tube element can be made. However, an additional liquid level measurement of this type is expensive.

SUMMARY OF THE INVENTION

The object of the present invention is to provide a circuit arrangement which removes the need for additional liquid level measurement, even when the level of liquid in the tube element is low.

Another aspect of the present invention is the provision of alternative embodiments of the filter circuit arrangement, each having its own individual advantages.

BRIEF DESCRIPTION OF THE DRAWINGS

The invention is explained below by means of an embodiment and with reference to the drawings.

FIG. 2 shows a different arrangement from FIG. 1 of the magnets which produce the magnetic field.

DETAILED DESCRIPTION OF THE INVENTION

Figure 1:
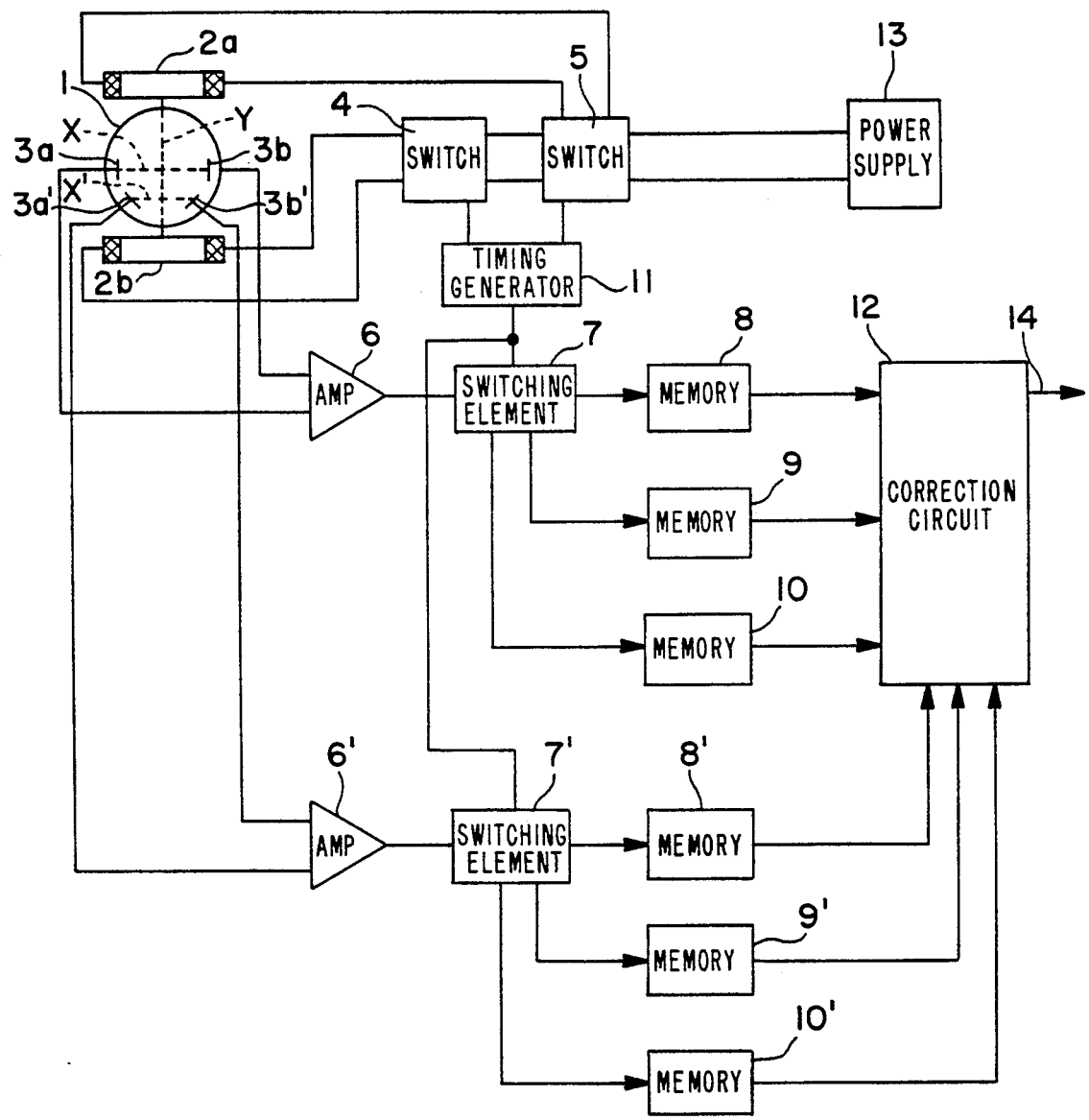
FIG. 1 shows an embodiment of a circuit arrangement according to the present invention.

FIG. 1 shows a tube element 1, consisting, on the inside, of electrically insulating material and two electromagnets $2a$ and $2b$ which produce a magnetic field which passes essentially diametrically through the tube element 1. Two electrodes $3a$ and $3b$, which are affected by charge displacements in the liquid, are positioned in such a way that their central connection line X passes through the flow essentially diametrically in relation to the tube element 1 and essentially at right angles to the central connection line Y between the electromagnets $2a$ and $2b$. The electromagnets $2a$ and $2b$ are connected via polarity changing switches/off-switches 4 and 5 to a power supply unit 13. With appropriate modification of the circuit, the electromagnets $2a$ and $2b$ can also be connected in series and, in order to alter the excitation of the electromagnet $2a$ or the electromagnet $2b$, an auxiliary winding may be provided on the electromagnet $2a$ or $2b$ which causes excitation with the opposite polarity to that involved in the excitation of the primary winding. The electrodes $3a$ and $3b$ are connected to signal amplifier 6, the output of which is connected to signal switching element 7. A timing generator 11 synchronously connects the polarity changing switches/off-switches 4 and 5 to output channels of the signal switching element 7, which lead, for example, to signal memory 8 when the electromagnets $2a$ and $2b$ have the same polarity, to a signal memory 9 when the electromagnets $2a$ and $2b$ have the opposite polarity, and to a signal memory 10 when the electromagnet $2b$ is switched off. The signals stored in the signal memories 8, 9, 10 are processed in a correction circuit 12 using empirical parameters, so that at the output 14 of the correction circuit 12 a signal occurs which is essentially unaffected by disturbances in the flow profile in the tube element 1, in particular by deviations in the flow profile in terms of rotational symmetry.

Below the electrodes $3a$ and $3b$, two further electrodes $3a'$ and $3b'$ are disposed, which are affected by charge displacements in the liquid and whose central connection line X' passes through the flow essentially diagonally in relation to the tube element 1 and essentially at right angles to the central connection line Y between the magnets $2a$ and $2b$. The timing generator 11 furthermore controls a second switching element 7' which feeds the measuring voltages obtained via a signal amplifier 6' from the second electrodes $3a'$ and $3b'$ into second memories 8', 9', and 10' which correspond to memories 8, 9, and 10. i.e. to different switching states of the electromagnet $2b$. The outputs of these memories 8', 9', and 10' are also connected to the correction circuit 12 in order to produce the output signal at the output 14 also from the signals stored in these memories 8', 9', and 10' using empirical parameters.

In the embodiment according to FIG. 1, a common pair of electromagnets $2a$ and $2b$ is allocated to the two switching elements 7 and 7'.

In the embodiment according to FIG. 2, different electromagnets $2a$ and $2b$ on the one hand and $15a$ and $15b$ on the other hand are allocated to the two switching elements 7 and 7', where the pair $15a$ and $15b$ is optimized for level measurements when the tube is partially full.

The present invention operates on the principle that an inductive flowmeter indicates a different measured value when the tube element 1 is partially full, owing to the disturbed valency distribution in the tube element 1 as a result of it being partially full.

The level of liquid in the tube element 1 can also be calculated from the voltages delivered by the electrodes $3a$, $3b$ and $3a'$, $3b'$ and possibly further electrodes.

Functions of the described arrangement are explained in more detail below:

1. Operation with the pair of electromagnets $2a$ and $2b$ and the pair of electrodes $3a$ and $3b$ 1.1 Criterion for use The measurement system is normally used with the pair of electromagnets $2a$ and $2b$ and the pair of electrodes $3a$ and $3b$ whenever the tube element 1 is completely or almost completely filled with liquid. The system automatically performs the required level calculation in this case. The pair of electromagnets $2a$ and $2b$ is optimized in terms of magnetic field distribution primarily for a full tube element 1. (The representation of flat coils in FIG. 1 and FIG. 2 is insignificant in this context).

1.2 The following measuring cycles (timing sequences) are advantageous:

1.2.1 Timing sequence A (1) Both electromagnets 2a and 2b are excited simultaneously and with the same polarity over a full period.

The measured value determined during this period by the pair of electrodes 3a and 3b is fed via the switching element 7 to the memory 8.

(2) Electromagnet 2a only is excited for a full period and the measured value determined by the pair of electrodes 3a and 3b is fed via the switching element 7 to the memory 9.

(3) Electromagnet 2b only is excited for a full period and the measured value determined by the pair of electrodes 3a and 3b is fed via the switching element 7 to the memory 10.

The sequence of steps (1) to (3) may be varied as required.

Timing sequence B (1) Both electromagnets 2a and 2b are excited simultaneously and with the same polarity over a full period.

The measured value determined during this period by the pair of electrodes 3a and 3b is fed via the switching element 7 to the memory 8.

(2) Both electromagnets 2a and 2b are excited simultaneously and with the opposite polarity over a full period.

The measured value determined during this period by the pair of electrodes 3a and 3b is fed via the switching element 7 to the memory 9.

The memory 10 is not required for this timing sequence.

2. Operation with the pair of electromagnets 2a and 2b and the pair of electrodes 3a' and 3b'

2.1 Criterion for use

The measurement system is normally used with the pair of electromagnets 2 and the pair of electrodes 3' whenever the tube element 1 is only partially full, in particular, when it is less than 50% full, since, in this case, no further measuring voltage is recorded by the pair of electrodes 3a and 3b. The height at which the pair of electrodes 3a' and 3b' is installed determines the lower limit of the level which the system can still measure.

2.2 The following measuring cycles (timing sequences) are advantageous:

2 2.1 Timing sequence A (1) Both electromagnets 2a and 2b are excited simultaneously and with the same polarity over a full period.

The measured value determined during this period by the pair of electrodes 3' is fed via the switching element 7' to the memory 8'.

(2) Electromagnet 2a only is excited for a full period and the measured value determined by the pair of electrodes 3a' and 3b' is fed via the switching element 7' to the memory 9'.

(3) Electromagnet 2b only is excited for a full period and the measured value determined by the pair of electrodes 3' is fed via the switching element to the memory 10'.

The sequence of steps (1) to (3) may be varied as required.

2.2.2 Timing sequence B (1) Both electromagnets 2a and 2b are excited simultaneously and with the same polarity over a full period.

The measured value determined during this period by the pair of electrodes 3a' and 3b' is fed via the switching element 7' to the memory 8'.

(2) Both electromagnets 2a and 2b are excited simultaneously and with the opposite polarity over a full period.

The measured value determined during this period by the pair of electrodes 3a' and 3b' is fed via the switching element 7' to the memory 9'.

The memory 10' is not required for this timing sequence.

3. Operation with the pair of electromagnets 15a and 15b and the pair of electrodes 3a' and 3b'

3.1 Criterion for use

The measurement system can be used as an alternative with the pair of electromagnets 15a and 15b and the pair of electrodes 3a' and 3b' whenever the tube element 1 is only partially full.

The conditions are therefore the same as those set out in section 2 except that a different pair of electromagnets is used.

The pair of electromagnets 15a and 15b differs from the pair of electromagnets 2a and 2b in terms of magnetic field distribution insofar as it is optimized for partially filled tube elements 1.

3.2 The following measuring cycles (timing sequences) are advantageous 3 2.1 Timing sequence A (1) Both electromagnets 15a and 15b are excited simultaneously and with the same polarity over a full period.

The measured value determined during this period by the pair of electrodes 3a' and 3b' is fed via the switching element 7' to the memory 8'.

(2) Electromagnet 15a only is excited for a full period and the measured value determined by the pair of electrodes 3a' and 3b' is fed via the switching element 7' to the memory 9'.

(3) Electromagnet 15b only is excited for a full period and the measured value determined by the pair of electrodes 3' is fed via the switching element 7' to the memory 10'.

The sequence of steps (1) to (3) may be varied as required.

3.2.2 Timing sequence B (1) Both electromagnets 15a and 15b are excited simultaneously and with the same polarity over a full period.

The measured value determined during this period by the pair of electrodes 3a' and 3b' is fed via the switching element 7' to the memory 8'.

(2) Both electromagnets 15a and 15b are excited simultaneously and with the opposite polarity over a full period.

The measured value determined during this period by the pair of electrodes 3a' and 3b' is fed via the switching element 7' to the memory 9'.

The memory 10' is not required for this timing sequence.

Optimization of the magnetic field, which is mentioned several times above, is to be understood as follows:

As shown in FIG. 2, the coil 15a has a smaller diameter than the coil 15b. As a result of this, the magnetic field in the upper part of the tube element 1 is stronger than in the lower part of tube element 1. This qualitative characteristic is a determining factor in the "Optimization" process: The magnetic field weakens from top to bottom in the longitudinal mid-plane of the tube element 1.

What is claimed:

1. Flow measuring apparatus comprising:
   a tube element through which fluid containing electric charges flows;
   magnetic field generating means disposed outside said tube element for producing a magnetic field which passes through said tube element and is centered along a vertical diameter of said tube element;
   a first pair of electrodes disposed inside said tube element along a horizontal diameter of said tube element and responsive to electric charges in fluid flow through said tube element for sensing electric charges passing through said magnetic field;
   a second pair of electrodes disposed inside said tube element along a horizontal line below said horizontal diameter of said tube element and responsive to electric charges in fluid flow through said tube element for sensing electric charges passing through said magnetic field;
   timing circuit means for controlling said magnetic field generating means to sequentially generate a plurality of magnetic fields in a predetermined timing sequence;
   and signal processing circuit means responsive to said timing circuit means and said first pair and said second pair of electrodes for:
   (a) developing a first set of signals from said first pair of electrodes as said plurality of magnetic fields is generated and the passage of electric charges is sensed by said first pair of electrodes,
   (b) developing a second set of signals from said second pair of electrodes as said plurality of magnetic fields is generated and the passage of electric charges is sensed by said second pair of electrodes, and
   (c) correcting said first and said second sets of signals by empirical parameters
   to develop an output signal representative of fluid flow through said tube element.

2. Flow measuring apparatus according to claim 1 wherein said timing circuit means include:
   (a) a timing generator for establishing said predetermined timing sequence, and
   (b) switching means responsive to said timing generator for controlling said magnetic field generating means
   and said signal processing circuit means include:
   (a) a first plurality of memory means for storing signals derived from said first pair of electrodes,
   (b) a first switching element responsive to said timing generator for sequentially coupling said first pair of electrodes to said first plurality of memory means to individually store said first set of signals in said first plurality of memory means,
   (c) a second plurality of memory means for storing signals derived from said second pair of electrodes,
   (d) a second switching element responsive to said timing generator for sequentially coupling said second pair of electrodes to said second plurality of memory means to individually store said second set of signals in said second plurality of memory means, and
   (e) a correction circuit connected to said first plurality and said second plurality of memory means for correcting said first and said second sets of signals.

3. Flow measuring apparatus according to claim 2 wherein said magnetic field generating means include a pair of magnets, at least one of which is an electromagnet, and said pair of magnets is disposed along said vertical diameter of said tube element.

4. Flow measuring apparatus according to wherein said magnetic field generating means include:
   (a) a first pair of magnets disposed along said vertical diameter of said tube element, and
   (b) a second pair of magnets disposed along said vertical diameter of said tube element
   and said timing circuit means control said:
   (a) first pair of magnets to generate a first plurality of magnetic fields to develop said first set of signals, and
   (b) second pair of magnets to generate a second plurality of magnetic fields to develop said second set of signals.

5. Flow measuring apparatus according to claim 1 wherein said magnetic field generating means include at least two magnets and said timing circuit means include means for controlling said magnets independently to sequentially generate said plurality of magnetic fields.

* * * * *

UNITED STATES PATENT AND TRADEMARK OFFICE
CERTIFICATE OF CORRECTION

PATENT NO. : 5,301,556
DATED : April 12, 1994
INVENTOR(S) : Peter Nissen, Hans W. Schwiderski It is certified that error appears in the above-indentified patent and that said Letters Patent is hereby corrected as shown below:

In claim 4, column 6, line 30, insert the words "claim 1" after — according to — and before —wherein —.

Signed and Sealed this

Eighth Day of November, 1994

Attest:

BRUCE LEHMAN

Attesting Officer     Commissioner of Patents and Trademarks